INVENTOR
JOHN P. RUPERT
BY Young & Thompson
ATTYS.

Nov. 19, 1968   J. P. RUPERT   3,411,827
MECHANISM FOR FEEDING ARTICLES
INTO PNEUMATIC PIPELINES
Filed March 16, 1967   4 Sheets-Sheet 3
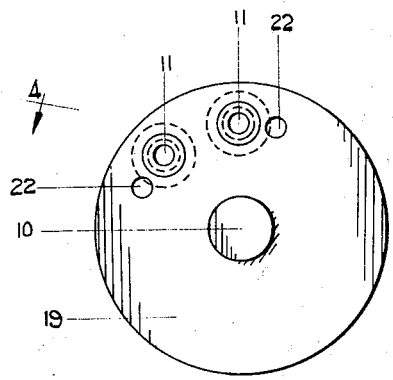
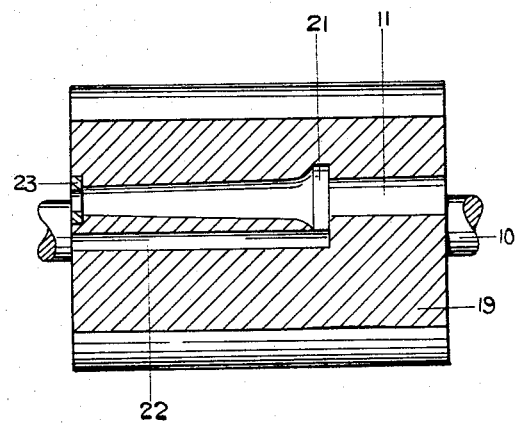
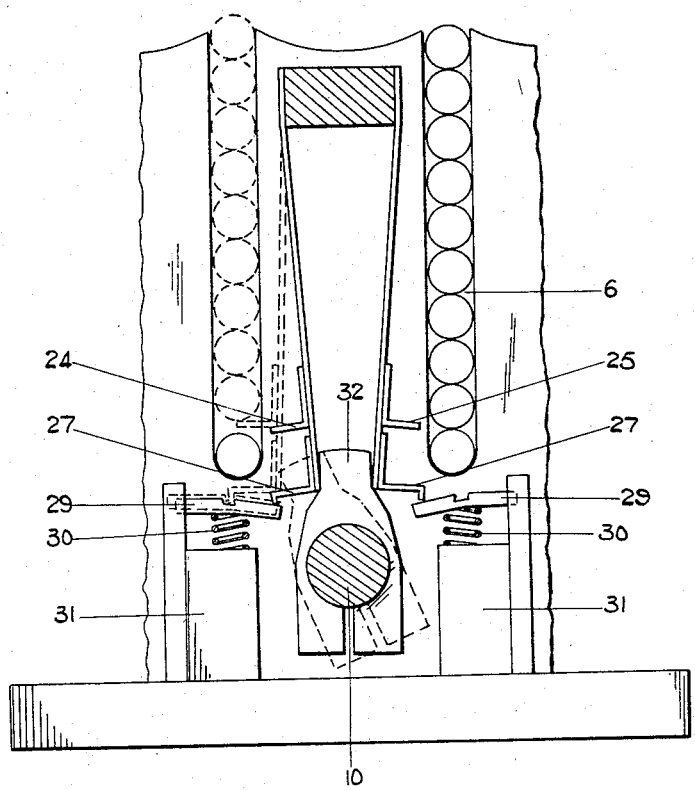
INVENTOR
JOHN P. RUPERT
BY Young + Thompson
ATTYS.

Nov. 19, 1968  J. P. RUPERT  3,411,827
MECHANISM FOR FEEDING ARTICLES
INTO PNEUMATIC PIPELINES

Filed March 16, 1967  4 Sheets-Sheet 4

INVENTOR
JOHN P. RUPERT
BY Young & Thompson
ATTYS.

United States Patent Office 3,411,827
Patented Nov. 19, 1968

3,411,827
MECHANISM FOR FEEDING ARTICLES INTO PNEUMATIC PIPELINES
John P. Rupert, Stellenbosch, Cape, Republic of South Africa, assignor to Tobacco Research and Development Institute Limited, Zug, Switzerland
Filed Mar. 16, 1967, Ser. No. 623,690
Claims priority, application Republic of South Africa, Mar. 18, 1966, 1,528/66; June 28, 1966, 3,809/66; Jan. 19, 1967, 316/67
11 Claims. (Cl. 302—2)

ABSTRACT OF THE DISCLOSURE

A valve for feeding articles in and out of pipelines comprising a drum movable between two positions of dwell and a bore in the drum which in one position of dwell registers with a pipeline and in the other position with a receiving or dispatching station, articles being blown out of or being sucked into the bore at the station, so that an article is axially translated at the station and laterally moved by the movement of the drum.

---

This invention relates to pneumatic conveyance systems.

One of the problems connected with pneumatic conveyance systems is to feed articles into and out of a conveying line continuously at substantially regularly spaced intervals.

Take the case of cigarette filter rods. In the making room the rods are being made continuously and in the cigarette factory they are being consumed continuously. The making machine delivers the rods to a bin the width of which is the length of a rod. These rods have to be extracted from the bin and fed into a pneumatic conveying line.

A valve for doing this has already been proposed. In this proposal, which for reasons which are not relevant has not become widely known, the rods fall into slots and a valve mechanism at the base of the slots received the rods in turn and transfers them laterally into register with the conveying line. Thus the rods descend laterally into the valve, are transferred laterally by mechanically moving the valve and are then propelled axially along the line. The valve has a slot open along its whole length for receiving the rods. Obviously there are difficulties in sealing the slot. If any part of the mechanism malfunctions, and a rod is caught in the mechanism, considerable dismantling of the valve is required to set matters right again.

An object of the invention is to provide a mechanism to effect transfer into and out of pneumatic lines somewhat more effectively.

In a mechanism for effecting the transfer of articles of fixed shape in and out of pneumatic pipelines, which mechanism comprises a body movable between at least two positions of dwell, a recess in the body for containing an article, a pneumatic pipeline terminal which is in register with the recess during the first position of dwell and a station at which an article is translated relatively to the recess during the second position of dwell, the invention provides the improvement of a bore in the body that constitutes the recess and is axially in register with the pipeline during the first position of dwell, a station which faces the bore in the axial direction in the second position of dwell, and means at the station for axially translating an article relatively to the bore, so that an article is received axially into the bore, transferred laterally and again leaves the bore axially.

Figure 1:
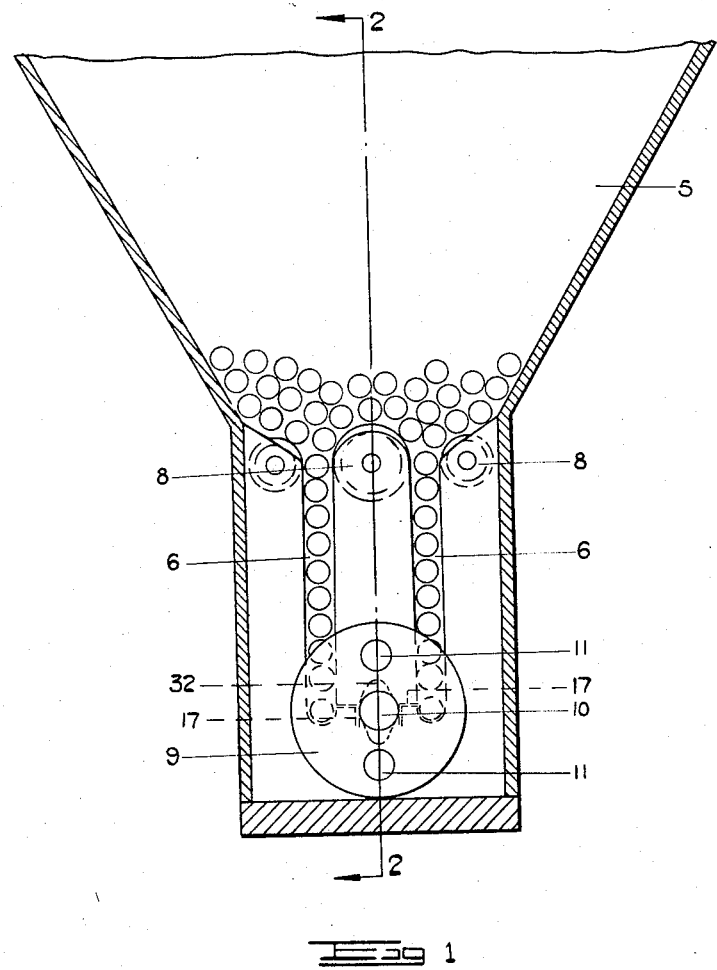
Figure 2:
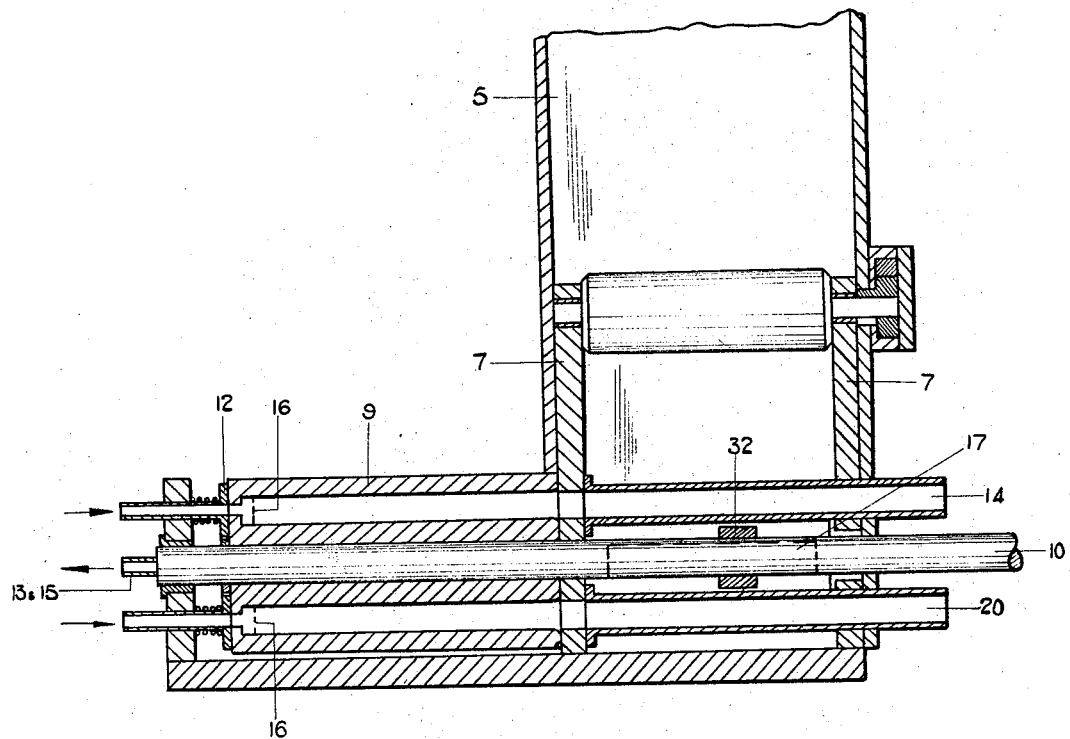
Figure 5:
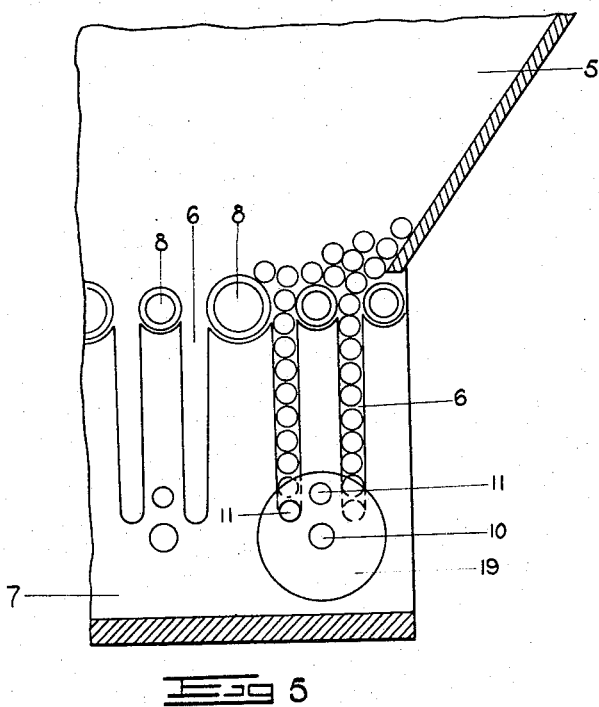
Figure 6:
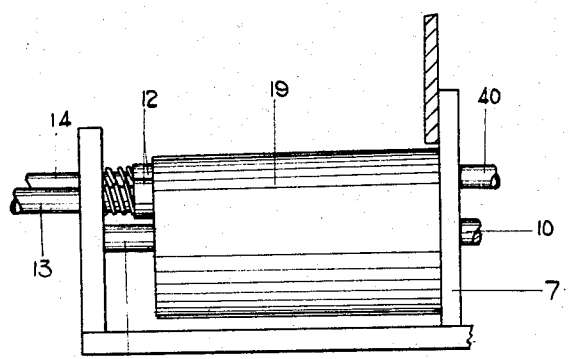

The invention is further discussed with reference to the accompanying drawings, in which:

FIGURE 1 is an end view of a mechanism according to the invention with parts removed,
FIGURE 2 is a section on the line 2—2 in FIGURE 1,
FIGURE 3 is an end view of a modified form of drum,
FIGURE 4 is a section on the line 4—4 in FIGURE 3,
FIGURE 5 is a view similar to FIGURE 1 of a preferred embodiment of the invention,
FIGURE 6 is a side view of part of FIGURE 5, and
FIGURE 7 is an end view of a latching mechanism for feeding an oscillating drum.

In FIGURES 1 and 2 there is a bin 5 which contains, say, filter rods and which in its base has two slots 6 defined between walls 7. Suitable agitators 8 ensure that the slots are properly filled as long as there are rods in the bin 5. In FIGURE 1 an end plate of the bin 5 has been removed for the sake of clarity.

The pair of slots 6 serves a drum 9 which is rotated about a shaft 10 by means not shown to have a period of dwell at each quarter of a revolution. The dump 9 has two parallel bores 11 parallel to the shaft 10.

At its rear the body 9 is pressed upon by four spring pressed porting devices 12 leading from four pneumatic lines 13, 14, 15 and 20. The lines 14 and 20 are pneumatic lines into which the rods are to be fed. The lines 13 and 15 are connected to a source of reduced pressure.

Upon rotation of the drum 9 each bore moves from a first position in which it is in register with the lines 14 and 20 to a second position in which it is in register with lines 13 and 15, as the case may be. In the first position whatever is contained in the two bores 11 is carried along in the pneumatic line, the direction is not critical, but as illustrated in FIGURE 2 conveyance is to the right in the direction of the arrow. In the second position whatever lies to the right (FIGURE 2) of the bores 11 is sucked into the bores.

Of course, the rotation mechanism is arranged to have sufficient dwell to ensure that rods can pass in and out of the bore 11. In other words, the drum is rotated intermittently in such a manner that there is sufficient dwell whenever the drum is in register with the slots or in register with the pneumatic transfer lines 14 and 20. To facilitate sucking in the right hand mouth of the bore 11 has a slight conical flare terminating on a rounding. To avoid damage to a filter rod by contact with the porting device 12, the invention provides that the rod should be braked before it reaches the left end of the bore 11. For this purpose a grid 16 is provided. The grid may be a disc with peripheral holes and a central hole. Around the central hole there is a resilient annular cushion say, of foam rubber which has a smaller outer diameter than the outer diameter of a rod. Thus braking is against the core of the rod and not against its outer covering.

There remains the problem of presenting rods to both bores 11 in their second position. This is done as follows: the slots 6 terminate in register with the second position of the bores that they are to serve. Above the base of each slot 6 there is a guard plate 17 (FIGURES 1 and 2) which moves across the slot 6 in phase with the movement of the bore 11 and prevents rods from moving downwards in the slot. The guard plate 17 is positioned in such a way that it also exercises a lifting action on the rods on top of it so that their weight cannot act upon the bottom rod which has to be sucked into the bore. The plates 17 are moved by a cam 32 on the shaft 10.

In use, rods fall down the slot 6, get sucked axially into the bores 11, get transferred laterally and are expelled from the bores 11 in the axial direction along the lines 14 and 20. It has been found that the device cannot be fouled up very easily. If a rod fails to home properly in a bore 11 or fails to escape fully, it is simply cut off and the debris cleared by pneumatic action.

The only significant wear is on the porting devices 12 and these are readily accessible for replacement without dismantling the whole device.

If for any reason dispatch of rods has to be discontinued, suction through the lines 13 and 15 is simply discontinued. However, with the rotating drum 9 dispatch to both lines 14 and 20 has to be interrupted simultaneously. If the drum 9 were oscillated about its axis so that each slot 6 fed only a single line 14 or 20, the suction can be selectively discontinued.

Obviously if the device is inverted it could be used to feed rods out of lines 14 and 20.

As shown in FIGURES 1 and 2 the drum 9 has two bores 11. If a larger throughput is desired there can be four bores, so that when a pair of bores is in register with the pipeline terminal the other pair is being charged from the slots 6.

A modified form of drum 9 is illustrated in FIGURES 3 and 4. The drum 19 has two bores 11. Each bore 11 at its inlet end is substantially cylindrical, and tapers to the left from an annular recess 21. For the sake of clarity the degree of taper has been exaggerated in the drawing.

An auxiliary bore 22 in the thickness of the drum 19 intersects the recess 21. The left hand end of the bore 11 is provided with an annulus 23 of a resilient material.

In use the drum 19 oscillates between its position of dwell and a pair of bores 11 serve a single pipeline.

A practical case of the use of drums 19 is illustrated in FIGURES 5 and 6. In this case a bin 5 has a series of slots 6 defined between end pieces 7 as in FIGURE 1.

Again there are three spring pressed porting devices 12 leading from three pneumatic lines 13, 14 and 15. The line 14 is connected to a source of pressure and serves to eject articles from the bores 11 into a pipeline 40. The lines 13 and 15 are connected to a source of reduced pressure.

Upon oscillation of a drum 19 each bore 11 moves from a first position in which it is in register with the line 14 to a second position in which its associated bore 22 is in register with a line 13 or 15, as the case may be. In the first position whatever is contained in the bore 11 is carried along the line 40. In the second position whatever lies in the slot 6 in front of the open mouth of the bore 11 is sucked into the bore. The fact that the air is sucked through the bore 22 causes a retarding effect on the article sucked into the bore 11 thus preventing any damage to the article.

When a bore 11 is in register with the line 14, the associated bore 22 is blocked off and when a bore 22 is in register with a line 13 or 15, the bore 11 is blocked off.

Note that in embodiments in which two slots serve one pneumatic pipeline, the rate of dispatch is double that of the case where only one slot serves a pipeline.

In FIGURE 7 a guard plate mechanism acting on adjacent slots 6 served by a common oscillating drum 19 is illustrated. Two guard plates 24 and 25 are carried on spring arms anchored at the top to fixed structure. Each arm 26 also carries a hooked top latch 27, 28. Each latch co-operates with a notched keeper 29 forming an integral part of the solenoid armature. It is biased upwardly by springs 30 and controlled by solenoids 31.

A cam 32 on the shaft 10 of the drum 19, which is shown in its intermediate position, i.e. in movement, acts on the arms 26. If the cam 32 oscillates to the left, the plate 24 intersects a slot 6 and thus holds the rods above the plate and prevents them from fouling the drum. When the cam 32 moves to the right, the plate 24 intersects its slot 6. This is all that happens during normal operation.

When for any reason it is desired that the drum 19 should stop dispatching rods, the solenoids 31 are de-energized. As a result the keepers 29 move up under the action of the springs 30. When next the plate 24 moves across its slot 6, the hook of the latch 27 enters its notch and upon reversal of the cam 32 stays latched. Afterwards when the cam 32 moves to the right the latch 28 also enters its keep.

Note that during normal operation the hooks of the latches clear the notches in the keepers 29.

If the drum has to recommence supplying rods, the solenoids 31 are again energized. However, due to the shape of the hooks and notches, the latches remain latched. Only after the cam 32 has released the hooks from the notches by moving to its limits on either side, can the solenoids overcome the hooks and thus release the plates to commence their function. This unlatching of the plates results in an exact timing for the release and stopping of rods in the slot 6.

I claim:
1. A mechanism for effecting the transfer of articles of fixed shape into pneumatic pipelines, which comprises a body movable between at least two positions of dwell, a bore in the body, a pneumatic pipeline terminal which is in register with the bore during the first position of dwell, a slot down which articles gravitate in single file and whose lower end is in register with the bore during the second position of dwell and pneumatic means for axially moving an article from the lower end of the slot into the bore.

2. A mechanism as claimed in claim 1 in which the bore converges in the direction in which an article is received into it.

3. A mechanism as claimed in claim 2 in which the pneumatic means is a source of suction the bore is provided with a peripheral recess intermediate its ends and the recess is connected to the source of suction in that position of dwell in which an article is received into the bore, the end of the bore towards which receipt takes place being blocked off in the receiving position.

4. A mechanism as claimed in claim 2 in which the bore is provided with an annular cushion of resilient material to serve as a stop for articles being received into the bore.

5. A mechanism as claimed in claim 1 in which the body is a drum.

6. The mechanism claimed in claim 5 in which the drum has two bores with a common pipeline terminal.

7. In a mechanism for effecting the transfer of articles of fixed shape into pneumatic pipelines, which mechanism comprises a body movable between at least two positions of dwell, a recess in the body for containing an article, a pneumatic pipeline terminal which is in register with the recess during the first position of dwell and a station at which an article is translated relatively to the recess during the second position of dwell, the improvement of a bore in the body that constitutes the recess and is axially in register with the pipeline during the first position of dwell, a station which faces the bore in the axial direction in the second position of dwell and which comprises the lower end of a substantially vertical slot, down which the articles gravitate in single file, a guard plate operable to move between a position where the slot is clear and a position to obstruct the slot above the article lying in the base of the slot, obstruction taking place when the body moves into the second position of dwell and during that position of dwell and means at the station for propelling the article into the bore so that the article is received axially into the bore, transferred laterally and again leaves the bore axially.

8. A mechanism as claimed in claim 7 including means to latch the guard plate in its obstructing position when feeding of articles into the pipeline is to be discontinued.

9. A mechanism as claimed in claim 7 in which the guard plate is spring-biased to its clear position and moved into its obstructing position by means of a cam moving with the body.

10. A mechanism as claimed in claim 9 in which the guard plate is provided with a latch co-operating with a keep, the keep is movable to a first position where the latch engages with it in the obstructing position of the guard plate and a second position in which the latch is clear of the keep.

11. A mechanism as claimed in claim 10 in which the keep is biased to the first position and including a solenoid which while energized keeps the keep in the second position against the biasing force.

References Cited

UNITED STATES PATENTS

| | | | |
|---|---|---|---|
| 2,299,565 | 10/1942 | Colburn | 302—49 |
| 2,740,672 | 4/1956 | Morrow | 302—49 |
| 2,785,828 | 3/1957 | Patzer | 221—116 |
| 2,856,097 | 10/1958 | McFaull | 302—2 X |
| 3,127,971 | 4/1964 | Schmermund | 221—68 X |

EVON C. BLUNK, *Primary Examiner.*

M. L. AJEMAN, *Assistant Examiner.*